United States Patent [19]
Sauer

[11] Patent Number: 5,997,232
[45] Date of Patent: Dec. 7, 1999

[54] METHOD OF MAKING CAN BODIES FROM SHEET METAL

[75] Inventor: Reiner Sauer, Neuwied, Germany

[73] Assignee: Rassellstein Hoesch GmbH, Andernach, Germany

[21] Appl. No.: 09/010,362

[22] Filed: Jan. 21, 1998

[30] Foreign Application Priority Data

Jan. 23, 1997 [DE] Germany .......................... 197 02 265

[51] Int. Cl.⁶ .......................... B21D 51/26; B23K 26/00
[52] U.S. Cl. .................................. 413/1; 413/69; 413/77
[58] Field of Search ................................ 413/77, 75, 74, 413/69, 70, 1

[56] References Cited

U.S. PATENT DOCUMENTS

| | | | |
|---|---|---|---|
| 3,204,847 | 9/1965 | Vitense | 413/69 X |
| 3,337,944 | 8/1967 | Morris | 413/69 X |
| 4,712,960 | 12/1987 | Opprecht et al. | 413/77 X |
| 4,805,795 | 2/1989 | Sato et al. | 413/77 X |
| 5,655,867 | 8/1997 | Gysi et al. | 413/75 X |

FOREIGN PATENT DOCUMENTS

| | | | |
|---|---|---|---|
| 1 142 147 | 1/1963 | Germany | 413/69 |
| 1 452 537 | 5/1969 | Germany . | |

*Primary Examiner*—James F. Coan
*Attorney, Agent, or Firm*—Flynn, Thiel, Boutell & Tanis, P.C.

[57] ABSTRACT

A method of making can bodies from sheet metal for manufacturing cans includes the steps of: feeding and superimposing two sheet metal strips rolled to finished thickness, joining the superimposed sheet metal strips by a plurality of connecting welded seams running continuously in the longitudinal direction of the strip, with a spacing from one another in the transverse direction of the strip corresponding to half the can body diameter, through continuous passage of the superimposed sheet metal strips through a welding device with a plurality of welding heads disposed with corresponding spacings from one another, cutting the sheet metal strips welded together along the middle of each connecting welded seam to create a plurality of flat tubes lying beside one another, optionally rolling up the flat tubes for intermediate storage and/or transport, unrolling the optionally rolled-up flat tubes, cutting the flat tubes transversely into flat tube sections whose length corresponds to approximately the can height, and spreading the individual flat tube section into a can body.

20 Claims, 4 Drawing Sheets

METHOD OF MAKING CAN BODIES FROM SHEET METAL

FIELD OF THE INVENTION

This invention relates to a method of making can bodies from sheet metal, for manufacturing cans.

BACKGROUND OF THE INVENTION

In making can bodies for manufacturing cans for foodstuffs, tin plate is mostly used today in the range of thickness from 0.14 to 0.49 mm. Starting with a tin plate strip with a maximum width of 1200 mm, this is given an inner and outer lacquering as a rule and is cut into sheet metal plates. The regions of the later welded seams must be left free of lacquer during the lacquering, strip-shaped block-outs being provided, since the lacquer interferes with the roller resistance welding. Single can blanks are cut from the sheet metal plates, corresponding in their width to the can circumference and in their length to the can height. The geometry of the can blanks has to be taken into account already in the lacquering, so that the lacquer-free block-outs actually come to lie in the region of the welded seams. The can blanks are fed in a stack to a roller resistance welding machine, where they firstly undergo a flexing process in order to relieve internal stresses and are then bent into a cylinder. The beginning and the end of the cylinder which is formed are overlapped with an overlap width of 0.5 mm and the overlapping edges are welded together through the roller resistance welding. The cylinder thus resulting from the flat can blank forms the can body. The initially lacquer-free welded region is given a seam coating at least on the inside. After the welding the can body is given an edge bead at each of its two ends, to serve for the later attachment of a lid and a bottom. The can body is also given stabilising beads as a rule, in order to increase its external pressure stability for the later sterilising process of the filling material. Extensive re-tooling is necessary to set up different can diameters and different can heights, requiring relatively long re-tooling times. The can blank magazine, the flexing device and the bending apparatus have to be newly set up for this. A modification of the feed device is necessary for different can heights. A change in the can diameter requires fitting a matching welding arm. The result of the long re-tooling times is that the actual production times only amount to 50 to 70% of the possible time in use. In addition, the welding of the can body is not a continuous welding operation but the one body end represents the starting point and the other end the end point of the welded seam. Both points introduce sources of error on account of the discontinuous welding process, so that tears can occur here when edge-beading the can body.

The invention is therefore based on the object of providing a method of making can bodies from sheet metal for the manufacture of cans which facilitates cost-effective production of can bodies, with a high process reliability, through continuous welding.

SUMMARY OF THE INVENTION

The method is characterized by the following method steps:

a) feeding and superimposing two sheet metal strips rolled to finished thickness, whose width amounts to a multiple of half the circumference of a can body, b) joining the superimposed sheet metal strips by a plurality of connecting welded seams running continuously in the longitudinal direction of the strip, with a spacing from one another in the transverse direction of the strip corresponding to half the can body diameter, through continuous passage of the superimposed sheet metal strips through a welding device with a plurality of welding heads disposed with corresponding spacings from one another, c) cutting the sheet metal strips welded together along the middle of each connecting welded seam to create a plurality of flat tubes lying beside one another, d) optionally rolling up the flat tubes for intermediate storage and/or transport, e) unrolling the optionally rolled-up flat tubes, f) cutting the flat tubes transversely into flat tube sections whose length corresponds to approximately the can height, g) spreading the individual flat tube section into a can body, especially a cylindrical can body.

The invention accordingly is based on the concept of forming a plurality of flat tubes alongside one another and initially connected together along the connecting welded seams, from two sheet metal strips of arbitrary width, by superimposing the sheet metal strips and continuous longitudinal welding thereof, the tubes then being separated from one another by longitudinal cutting of the sheet metal strips along the middle of each connecting welded seam. Simply by adjusting the mutual spacing of the welding heads in the strip transverse direction, the width of the flat tubes which are produced can be altered to the currently desired diameter of the can bodies later to be made therefrom. The width of the flat tube, apart from a small addition for the welded seams, corresponds to the can half diameter×π. The length of the flat tubes can amount to the length of the strips, which lies between 1000 and 5000 m. Since the welding process takes place continuously, there are no beginning and end effects on the can body which could affect the edge beading operation adversely. High process reliability is ensured by this. Also the curling round and overlapping of a weld seam, as were previously necessary in the roller resistance welding of individual can bodies and which was sensitive in its response to alterations in the strength of the material, are obviated in the novel method, which also enhances the process reliability. The flat tubes can be wound up and supplied to a packer, where they are cut transversely and spread out into can bodies with relatively simple machines. The flat tube occupies substantially less space during transport than an empty can, which also effects an economy. Cans of different heights can be made from a flat tube, simply in that flat tube sections are cut off from the flat tube by transverse cutting, with lengths corresponding approximately to the can height. The length of the flat tube section must be a small amount larger than the desired can height, since a small part of its length is needed for the two edge beads at the two ends of the can body after spreading out the flat tube section.

The connecting welded seams are advantageously made by laser welding. Thus the joining of the two sheet metal strips by means of a laser also allows the presence of organic coatings in the region of the welded seam, so that coating-free block-outs as are necessary for roller resistance welding can be dispensed with. Optimum design of the laser beam path in the welding offers the possibility of no damage occurring to the organic coating on the inside of the flat tube, so that a subsequent repair coating in the region of the welded seam of the can body can be dispensed with.

Furthermore the longitudinal cutting is advantageously effected by laser cutting. This on the one hand facilitates very accurate cutting and on the other hand results in an annealing process in the adjoining welded seams through the heating occurring in the laser cutting, which leads to good ability for them to deform.

The focus diameter of the welding laser should be so selected that the welding seam width corresponds to the sum of twice the sheet metal thickness plus the focus diameter of the following cutting laser. Thus if the cutting is effected in the cutting operation in the middle of the welded seam, then there remains a part of the welded seam on the resulting flat tubes whose width corresponds to about the sheet metal thickness.

A laser with an inner beam path of high energy density should be used for the laser cutting, for making the cut, and with an outer beam path of lower energy density for annealing the part of the remaining welded seam part of the adjoining flat tube on either side of the cut.

BRIEF DESCRIPTION OF THE DRAWINGS

The method according to the invention and further details of implementing this method will now be explained in more detail with reference to the accompanying drawings, in which.

DETAILED DESCRIPTION OF THE INVENTION

In order to carry out the method tin plate (tinned fine steel sheet), chromed fine steel sheet or even plain steel sheet can be used, in the range of thicknesses from 0.05 to 0.49 mm. The strength of the steel sheet can lie in the range between 200 and more than 1000 N/mm$^2$. The steel sheet can have an organic coating on one or both sides, which is applied in known manner by lacquering or as a plastics film. If necessary the coating can have block-outs in the region of the later welded seams. Sheet metal strips of other metals than steel can also be used, e.g. aluminium.

Figure 1:
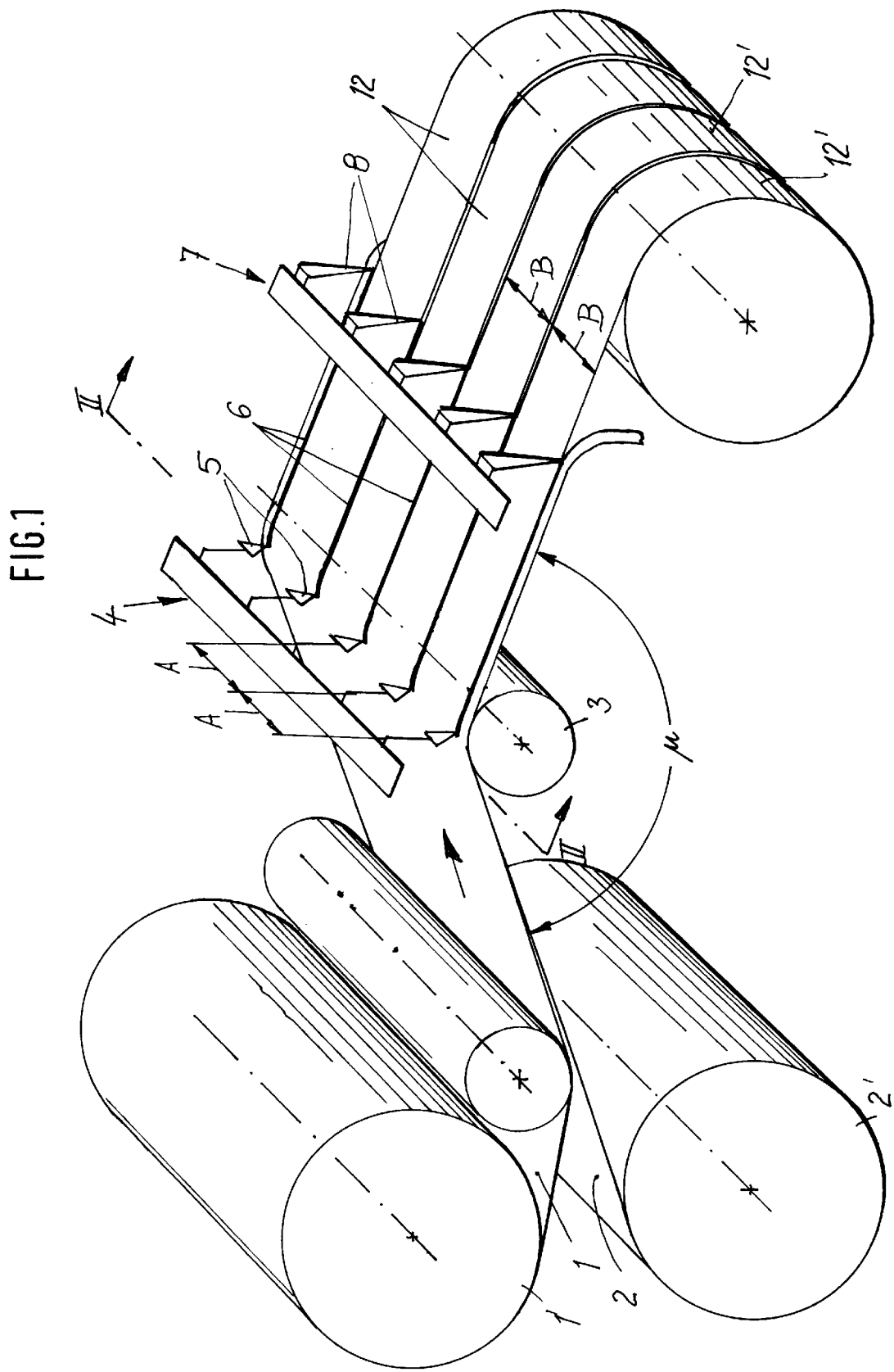
FIG. 1 is a schematic view of a first method step of the method according to the invention.

As can be seen from FIG. 1, two strips 1, 2 coming from two rollers 1', 2' are fed together and superimposed. The strips 1, 2 can have a width of 1200 mm for example. The superimposed sheet metal strips 1, 2 are so fed together under tension over a deflecting roller 3 that the strip sections running ahead of and after the deflecting roller 3 make an obtuse angle of deflection $\mu$. The tension in the two strips 1, 2 is created in that the rollers 1', 2' are braked during the unwinding of the sheet metal strips 1, 2, so that a so-called drag results and on the other hand the flat tubes 12 formed from the sheet metal strips 1, 2 are wound up under tension, so that a so-called draw results. A tension results in the superimposed sheet metal strips from the opposed actions of the drag and the draw and through the simultaneous deflection of the sheet metal strips 1, 2 by means of the deflecting roller 3, the sheet metal strips are pressed firmly together in the region of the deflecting roller 3. If desired pressure rollers, not shown, can also act from above.

In the region of the deflecting roller 3 there is arranged a welding device 4 having a plurality of welding heads 5. The mutual spacing A of the welding heads is adjustable. The welding heads 5 are advantageously in the form of laser welding heads. The superimposed and pressed together sheet metal strips 1, 2 are moved beneath the laser welding heads 5 at a speed of about 20 to 100 m/min, while each laser welding head 5 produces a connecting welded seam joining the two sheet metal strips 1, 2 together and running in the strip longitudinal direction. The laser welding takes place continuously from the start of the strip to the end of the strip. The spacing a of the connecting welded seams 6 determined by the spacing A of the laser welding heads 5 corresponds substantially to half the circumference of the can body to be produced, according to the formula a=0.5×D×π, where D is the nominal diameter of the can body. The mean distance A of the welding heads 3 is wider than the spacing a by the total width bs of the welded seam 6, as will be explained below with reference to FIGS. 3 and 4. The outer connecting welded seams have a spacing of at least 2 mm from the strip edges, so that edge seaming is possible.

After the two sheet metal strips 1, 2 have been welded together along the connecting welded seams 6 the longitudinal cutting of the sheet metal strips 1, 2 takes place at the cutting station 7 along the middle of each connecting welded seam 6, advantageously by means of a plurality of cutting lasers 8. Each cutting laser 8 is so adjusted that the cutting operation is effected centrally through the respective connecting welded seam 6, which is shown in more detail in FIG. 4.

A laser is advantageously used as the cutting laser 8 with an inner beam path 9a with high energy density and an outer beam path 9b with smaller energy density. The connecting welded seam 6, which has a width bs is split in its longitudinal centre through the inner beam path 9a with a width bt. On both sides of the separation created by the inner beam path 9a there remain welded seam parts 6a, through which the two superimposed sheet metal strips 1, 3 still remain welded together. The width of each welded seam part 6a should correspond to at least the sheet metal thickness s. The outer beam path 9b takes care of the annealing of the two remaining welded seam parts 6a, with its smaller energy density. This annealing is important for the following processing. It can be seen from FIG. 4 that the width bs of the welded seam 6 before the cutting should be approximately equal to the sum of the cutting gap width bt+2×s. Accordingly the focus diameter of each welding laser 5 should be so selected that the welded seam width bs corresponds to sum of twice the sheet metal thickness s plus the focus diameter of the cutting laser 8.

A plurality of flat tubes 12 separated from one another result from the laser cutting, with the upper sheet metal strip part 1 connected to the lower sheet metal strip part 2 at their longitudinal edges through the remaining, welded seam parts 6a. The flat tubes 12, whose length corresponds to the strip length, which can amount to 1000 and 1500 m, are wound up on reels 12'. The reels 12' can be then be stored and delivered to a filler or equally to a can manufacturer. Simply by shifting the welding lasers 5 and the cutting lasers 8 in the transverse direction of the strip the width B of the resulting flat tubes 12 can be adjusted in accordance with the desired can diameter. The width B corresponds to 0.5×D× π+2×s.

The connection of the two sheet metal strips 1, 2 by laser welding also permits the presence of organic coatings in the welded joints, so that the organic coating can be continuous on the sheet metal strips 1, 2 and the block-outs which are necessary in the conventional can welding by roller resistance welding can be dispensed with. An optimum design of the laser beam path in the laser welding also offers the possibility of no damage occurring to the organic coating on the inside of the flat tube 12, so that a repair coating of the subsequent can body can be dispensed with. The useful time phases of the welding device 5 are substantially increased by the continuous welding operation, so that the manufacturing costs of the can body are markedly reduced. Soft welded seams with good ability to deform result from the annealing process in the laser cutting.

Figure 5:
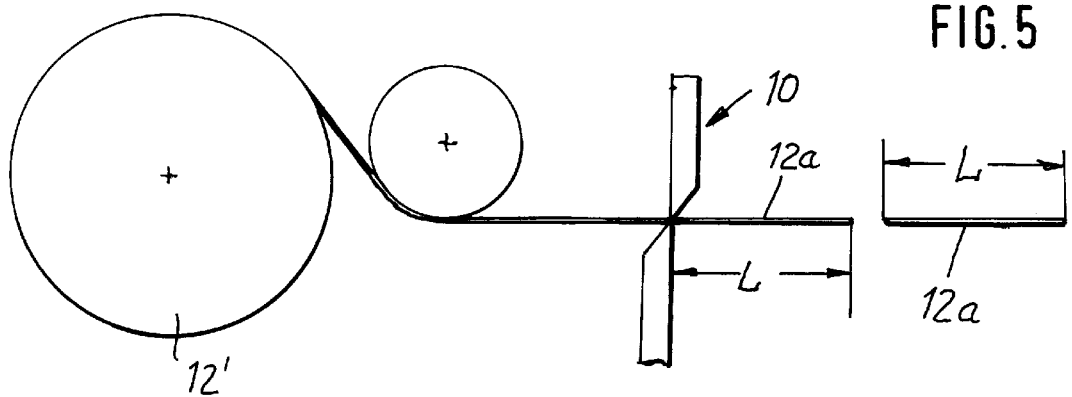
FIG. 5 is a schematic view of further method steps.

The manufacture of can bodies from the very long flat tubes 12 is carried out according to FIGS. 5–7, as follows:

The flat tube rolled on the reel 12' is unrolled and cut into individual flat tube sections 12a by transverse cutting at the transverse cutting device 10. The length L of a flat tube section 12a corresponds to the desired can height plus a small length of material which is required for the production of the two edge beads at the ends of the can body. After the transverse cutting the flat tube sections 12 are spread into a preferably cylindrical can body, as is shown in FIG. 6. Can body shapes with corners and profiles are also possible. The can body can also be provided with stabilising beads in the, spreading. The flat tube sections can be used not only for can bodies; other uses are possible, such as automobile parts for example.

Figure 6:
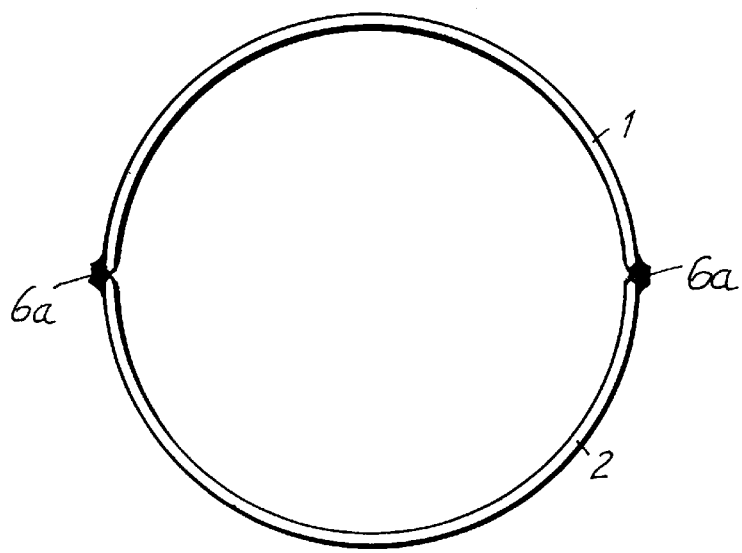
FIG. 6 shows the spreading of the flat tube section.
Figure 7:
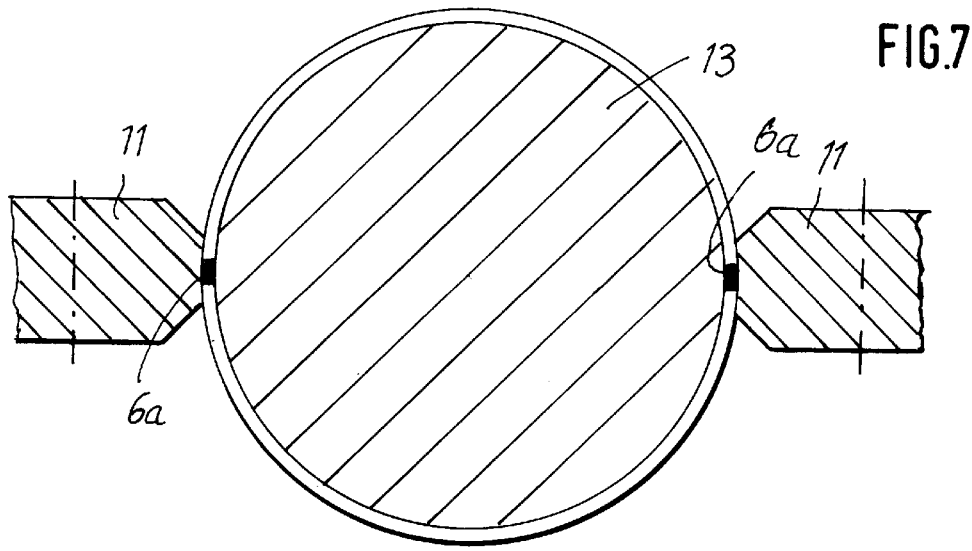
FIG. 7 shows the rolling flat of the welded seam.

Compared with conventional can bodies, which each have only one welded seam, the novel can bodies have two diametrically opposite welded seams, as is apparent from FIGS. 6 and 7. Should these welded seams interfere with the further processing, on account of their thickness, the welded seams 6a can be rolled flat by rollers 11, as is shown in FIG. 7. To this end, the can body is received on a mandrel 13. Flattened welded seams have the advantage that, when swaging in the can at the upper and lower ends of the can body, diameter reductions can be effected by swaging rings and no folds result therefrom. This swaging involves an outer ring and a mandrel, which allow for higher diameter reductions, the smaller forming the gap between the two parts. This gap can be made smaller and flatter by the welded seams 6a. The soft welded seams 6a can easily be pressed flat by the rollers 11 because of the annealing in the laser cutting.

If desired, the connecting welded seams 6 can also be produced by roller resistance welding. If the sheet metal strips are used which are provided on one or both sides with an organic coating, then the sheet metal strips must have strips free from coating running in the strip longitudinal direction, also called block-outs, in the region of the connecting welded seams, since no organic components can be present in the welded seam with roller resistance welding.

Figure 3:
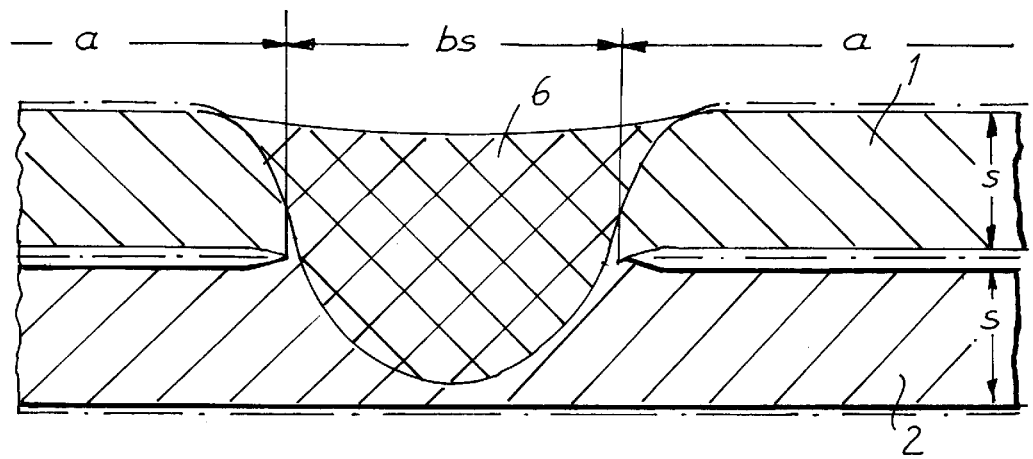
FIG. 3 is a cross-section of the sheet metal strips in the region of the welded seam, to a greatly enlarged scale.
Figure 4:
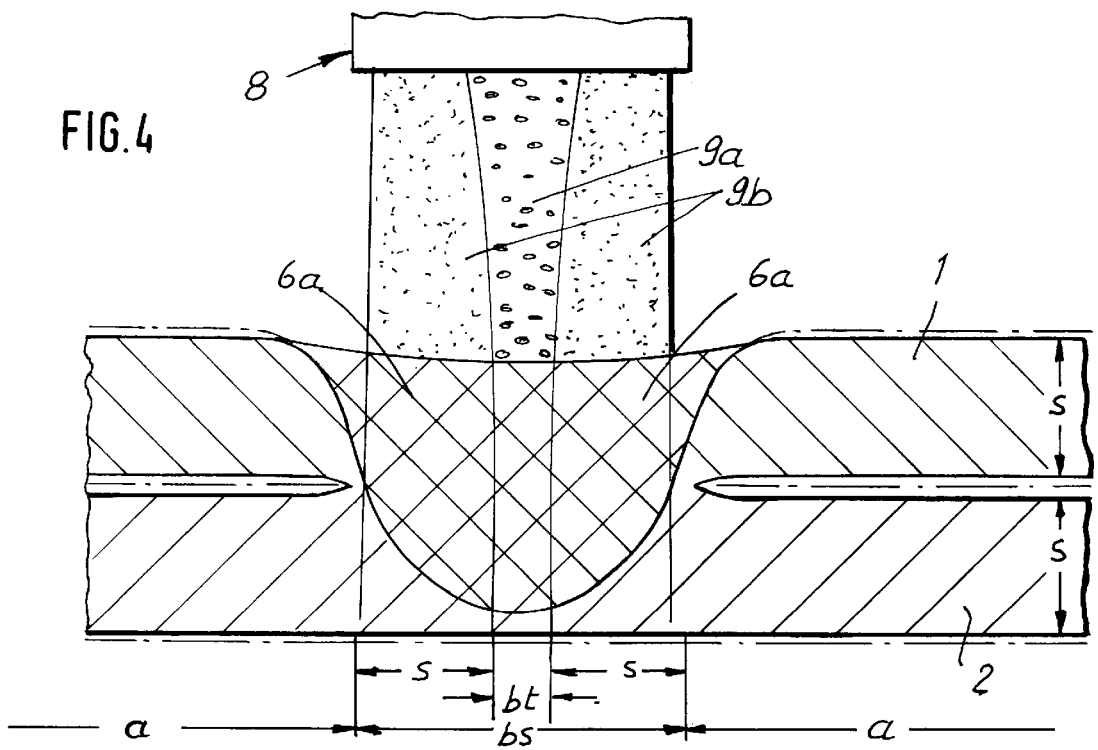
FIG. 4 is a cross-section of the sheet metal strips in the region of the cutting laser.

Since the method according to the invention is suitable both for sheet metals which are provided on one or both sides with an organic coating and for metal sheets without such a coating, such a coating is indicated only in FIGS. 3 and 4 by chain-dotted lines.

If the two superimposed sheet metal strips according to the invention have a thermoplastic plastic layer on their facing, inner sides, the heat in the marginal region of the welded seam should be introduced in a controlled way in the laser welding or laser cutting, so that sealing together of the two plastic layers in the region directly adjoining the welded seam is effected. This sealing should be effected over the whole welded seam length with a width of 0.1 to 0.3 mm. The sealed seam serves to cover the can welded seam on the inside of the can during the spreading of the flat tube into a can. Additional corrosion protection is then not necessary.

Investigations into laser welding have shown that the plastic material present on the facing inner sides of the sheet metal strips should advantageously be removed in the region of the subsequent welded seam, before the welding. The products of combustion of the plastics material which occur during the welding can to some extent pass as gases through the welded seam and lead to holes. The welded seam and thus the can would then not be tight.

Accordingly it is advantageous to remove the plastics material before the welding in the region of the subsequent welded seam. With a welded seam width of 0.4 mm for example the plastics material should be removed over a width of 0.4 to 1.0 mm, preferably 0.5 mm.

This is advantageously effected in that pressure with simultaneous application of heat is applied before the welding in the region of the subsequent welded seam on the outsides facing away from one another of the superimposed sheet metal strips, in order to force the thermoplastics material away to the side from the seam region.

Figure 2:
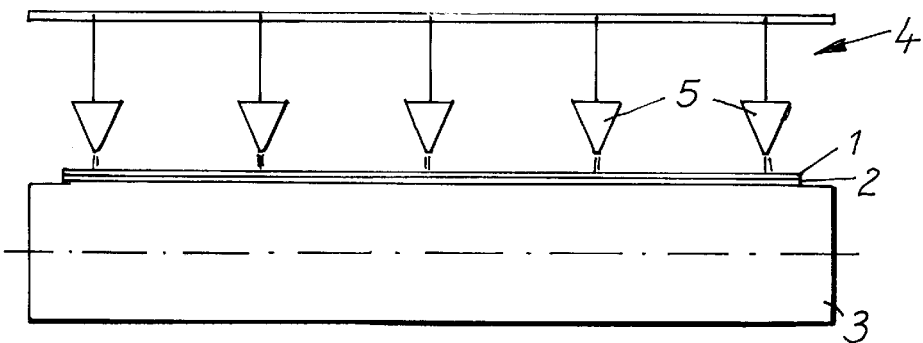
FIG. 2 is a schematic view of the welding device in cross-section on the line II—II of FIG. 1.
Figure 8:
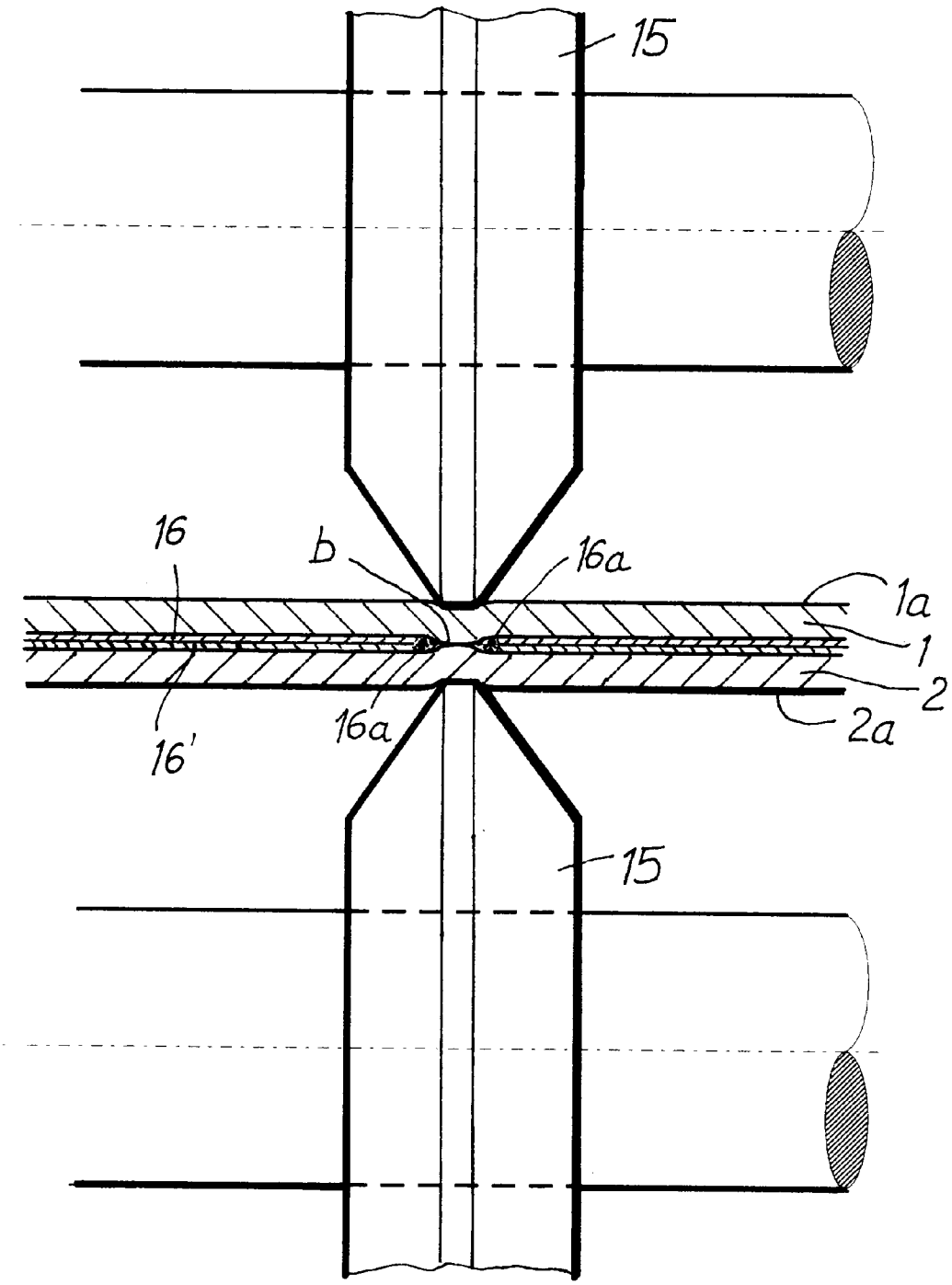
FIG. 8 is a cross-section of the sheet metal strips in the region of pressure rollers.

As can be seen from FIG. 8, the pressure and heating effect are advantageously applied by means of heated pressure rollers 15, which are arranged opposite one another and are pressed against the outsides 1a, 2a of the superimposed sheet metal strips 1, 2 as they are advanced. The pressure rollers 15 are located ahead of the laser welding heads 5 shown in FIGS. 1 and 2. The two plastics material layers are softened and forced aside by the heat and pressure of the pressure rollers 15 in a strip form region b of the subsequent welded seam. In the strip form region b the thickness of the plastics layers is therefore extremely small and reduces practically to zero. As a result there is hardly any plastic material still present in the region b of the subsequent welded seam, so that no interfering effects arise during the welding. At the same time a result of the pressure and the heat of the pressure rollers 15 is that the plastics material in the region b is caused to melt and the molten plastics material from the region b is forced aside to the left and the right. The two plastics layers 16, 16' are sealed (welded) together by the molten plastics material in the regions 16a and 16b, so that a coherent plastic layer is present during the widening of the flat tube into a can on its inside.

I claim:

1. A method of making can bodies from sheet metal for manufacturing cans, characterized by the following method steps:
   a) feeding and superimposing two sheet metal strips rolled to finished thickness, whose width amounts to a multiple of half the circumference of a can body,
   b) joining the superimposed sheet metal strips by a plurality of connecting welded seams running continuously in the longitudinal direction of the strip, with a spacing from one another in the transverse direction of the strip corresponding to half the can body diameter, through continuous passage of the superimposed sheet metal strips through a welding device with a plurality of welding heads disposed with corresponding spacings from one another,
   c) cutting the sheet metal strips welded together along the middle of each connecting welded seam to create a plurality of flat tubes lying beside one another,
   d) cutting the flat tubes transversely into flat tube sections whose length corresponds to approximately the can height, and e) spreading the individual flat tube section into a can body.

2. The method according to claim 1, wherein the connecting welded seams are made by laser welding.

3. The method according to claim 1, wherein the cutting along the middle of each of the connecting welded seams is effected by laser cutting.

4. The method according to claim 2, wherein the step of forming the connecting welded seams includes selecting a focus diameter of welding lasers so that a width of the welded seams corresponds to a sum of twice the sheet metal thickness plus a focus diameter of a cutting laser cutting along the middle of each of the connecting welded seams.

5. The method according to claim 3, wherein a laser is used for the laser cutting with an inner beam path of higher energy density, for making the cut, and an outer beam path of lower energy density for annealing welded seam parts of the adjoining flat tubes on either side of the cut.

6. The method according to claim 1, wherein the superimposed sheet metal strips are fed together under tension over a deflecting roller in the region of the welding heads so that strip sections running ahead of and after the deflecting roller form an obtuse angle with each other.

7. A method according to claim 1, characterized in that the connecting welded seams are rolled flat after the spreading.

8. A method according to claim 1, characterized in that the can body is provided with stabilising beads during the spreading.

9. The method according to claim 1, wherein the sheet metal strips are provided on one or both sides with an organic coating.

10. The method according to claim 1, wherein the connecting welded seams are created by roller resistance welding.

11. The method according to claim 10, wherein the sheet metal strips are provided on one or both sides with an organic coating, wherein the sheet metal strips are free from coating in the region of the connecting welded seams in the longitudinal direction of the strips.

12. The method according to claim 9, wherein the sheet metal strips are provided on their insides facing one another with a coating of thermoplastic material, the thermoplastic material being removed in the region of the subsequent welded seam before the welding.

13. The method according to claim 12, wherein before the welding, pressure with simultaneous application of heat is applied in the region of the subsequent welded seam to outside surfaces facing away from each other of the superimposed sheet metal strips, in order to force the thermoplastic material away to the side from the seam region.

14. The method according to claim 13, wherein the pressure and heating effect are applied by means of heated pressure rollers which lie opposite one another on the outside surfaces of the sheet metal strips.

15. A can with a can body which is manufactured according to claim 1.

16. A method of making can bodies from sheet metal for manufacturing cans, characterized by the following method steps:

a) feeding and superimposing two sheet metal strips rolled to finished thickness between 0.05 mm and 0.49 mm, whose width amounts to a multiple of half the circumference of a can body, b) joining the superimposed sheet metal strips by a plurality of connecting welded seams running continuously in the longitudinal direction of the strip, with a spacing from one another in the transverse direction of the strip corresponding to half the can body diameter, through continuous passage of the superimposed sheet metal strips through a welding device with a plurality of welding heads disposed with corresponding spacings from one another, c) cutting the sheet metal strips welded together along the middle of each connecting welded seam to create a plurality of flat tubes lying beside one another, d) rolling up the flat tubes for intermediate storage and/or transport, e) unrolling the rolled-up flat tubes, f) cutting the flat tubes transversely into flat tube sections whose length corresponds to approximately the can height, and g) spreading the individual flat tube section into a cylindrical can body.

17. A method of making can bodies from sheet metal for manufacturing cans, characterized by the following method steps:

a) feeding and superimposing two sheet metal strips rolled to finished thickness, b) continuously laser welding the superimposed sheet metal strips along a plurality of connecting welded seams running continuously in the longitudinal direction of the strip with a plurality of laser welding heads disposed with corresponding spacings from one another, and c) laser cutting with cutting lasers the sheet metal strips welded together along the middle of each connecting welded seam to create a plurality of flat tubes lying beside one another.

18. A method according to claim 17, wherein a focus diameter of the laser welding heads is selected so that a width of each of the welded seams corresponds to a sum of twice the sheet metal strip thickness plus a focus diameter of the cutting lasers.

19. A method according to claim 17, wherein the cutting lasers have an inner beam path of higher energy density, for making the cut, and an outer beam path of lower energy density for annealing welded seam parts of the adjoining flat tubes.

20. A method according to claim 17, wherein the plurality of laser welding heads and the cutting lasers are shifted transversely across a width of the superimposed sheet metal strips to form the plurality of flat tubes having different widths.

* * * * *